United States Patent [19]

Takeda

[11] Patent Number: 4,666,265
[45] Date of Patent: May 19, 1987

[54] SPECTACLE RIM PART MADE OF FIBER-REINFORCED RESIN
[75] Inventor: Tomihiro Takeda, Sabae, Japan
[73] Assignees: Takeda Color Frame Co., Ltd., Fukui; Nippon Kogaku K.K., Tokyo, both of Japan
[21] Appl. No.: 883,026
[22] Filed: Jul. 10, 1986

Related U.S. Application Data
[63] Continuation of Ser. No. 571,711, Jan. 18, 1984, abandoned.

[30] Foreign Application Priority Data
Jan. 21, 1983 [JP] Japan ................................. 58-8525
[51] Int. Cl.4 ............................................. G02C 13/00
[52] U.S. Cl. ...................................... 351/41; 351/154; 351/90
[58] Field of Search .................... 351/41, 90, 154, 95

[56] References Cited
U.S. PATENT DOCUMENTS
3,589,802  6/1971  Amaru ............................. 351/754
FOREIGN PATENT DOCUMENTS
51-122640  10/1976  Japan .
0016110   2/1981   Japan .................................. 351/41
0089716   7/1981   Japan .................................. 351/41

Primary Examiner—Rodney B. Bovernick
Assistant Examiner—P. M. Dzierzynski
Attorney, Agent, or Firm—Shapiro and Shapiro

[57] ABSTRACT

A slim spectacle rim part comprises an integrally lens-holding rim in the form of an open ring and having a pair of side joints provided on the two adjacent ends of the open-ring shaped rim. The molding is of a thermoplastic resin reinforced with short fibers.

7 Claims, 5 Drawing Figures

SPECTACLE RIM PART MADE OF FIBER-REINFORCED RESIN

This is a continuation of application Ser. No. 571,711 filed Jan. 18, 1984, now abandoned.

BACKGROUND OF THE INVENTION

1. Field of the Invention

This invention relates to a spectacle rim part made of a synthetic resin and comprising a slim lens-holding rim.

2. Description of the Prior Art

Hitherto, spectacle frames have been made from metals, synthetic resins (such as celluloid, acetyl cellulose, epoxy resin, nylon, etc.), tortoise-shell and such. Metals are favored because they are easy to work into a slim frame. Synthetic resins are desired for their light weight, and tortoise-shell, which is a natural product, is valued for its rarity. Recently, a demand has grown among spectacle wearers for a slim spectacle frame made of synthetic resin. However, it has not been possible to commercialize a slim spectacle frame made of a synthetic resin because such a frame characteristically lacks sufficient strength to withstand practical use and is too elastic to hold the lenses securely in position.

SUMMARY OF THE INVENTION

The object of this invention, therefore, is to provide a spectacle rim part which is made of a synthetic resin and hence is light in weight, and which also has a lens holding rim which is as slim as that of a metal frame. To this end, this inventor has made efforts to improve synthetic resins adaptable to the intended use and more particularly has found that a fiber-reinforced synthetic resin has sufficient strength for practical use even if it is made into a slim rim and further that such a synthetic resin, when worked into a slim rim, shows no tendency to stretch, thus preventing the problem of the lens falling out of the rim in use. Conventional lens-holding rims made of synthetic resin are of a closed annular structure generally conforming in shape to the contours of the lenses to be mounted in the rims. The mounting of a lens into the holding rims is done by taking advantage of the ability of synthetic resin to soften and stretch when heated. With fiber-reinforced synthetic resin, however, it is difficult to locate the lens correctly in the rim since such a resin does not stretch much even when heated. If attempts are made to force the lens into place, the holding rim can be damaged by the corners of the lens (especially with a glass lens). Also, when such an annular rim is injection molded, a weldline forms at the part of the rim where two resin flows from opposite directions meet, making the rim liable to break at that part. It has been discovered that this tendency becomes more serious when using a fiber-reinforced resin so that it is impracticable to mold such a fiber-reinforced resin into a rim of a closed annular structure. As a result of further studies, this inventor conceived of constituting a resin lens-holding rim from an open annular structure, the ring being closed by screw means. This structure involves the provision of a pair of upper and lower side joints at the two adjacent ends of the open annular lens rim, but it was found that if these side joints are joined to the ends of the lens-holding rim by adhesive or by heat fusion, the joints are liable to part. It was also found that such adhesion or heat fusion of synthetic resin is difficult, especially when there are fibers in the resin. This inventor therefore decided to mold both the lens-holding rim and the side joint as a single molding and found that such an integral molding provides a strong bond between the two types of member since fibers extend over both of them. It was also learned that since injection molding is the most preferable mode of molding in terms of production efficiency, it is best for the purposes of this invention to use a thermoplastic resin and incorporate short fibers therein as reinforcing fibers. As will be readily apparent, by virtue of the open ring design, the injection molded resin will be continuous along the ring from one end to the other so as to avoid the aforementioned weld line.

Thus, the present invention provides a slim spectacle rim part comprising an integral molding of an open annular lens-holding rim with a pair of side joints provided at the two adjacent ends of the annular rim, the molding being of a thermoplastic resin reinforced with short fibers.

Short fibers that can be used in this invention include glass fibers, carbon fibers, boron fibers, silica fibers, quartz fibers, whiskers of $Al_2O_3$, MgO, W, SiC, etc., inorganic fibers, and organic fibers such as polyamide fibers. Of these, carbon fibers are most preferred. These short fibers may be preferably subjected to a sizing treatment with nylon, epoxy resin, silicone or the like before use, to increase their compatibility with the synthetic resin. The short fibers used in this invention are preferably 5 to 15 microns in diameter and about 0.05 to 1 mm in length. Thicker fibers would make the resin brittle and also provide deleterious to the surface luster of the molded product, while fibers which are too long would make the molding difficult and also cause a biased orientation and distribution of fibers, resulting in non-uniform strength of the product. The short fibers are mixed with the thermoplastic resin before molding. Examples of thermoplastic resins preferred for practice of this invention are polybutylene terephthalate, polyethylene terephthalate, ABS, AS resin, PPS, polyacetal, the various kinds of nylon, high-density polyethylene, polypropylene, polysulfone, polycarbonate, modified PPO, etc. Of these, nylon 6,6, nylon 6 and nylon 12 are the most preferred. The short fibers are mixed into the synthetic resin in a ratio of 10 to 40% by weight, preferably 20 to 30% by weight, to 100% by weight of the total mixture. A quantity of short fibers less than 10% by weight will not provide the desired effect of reinforcement, while a quantity greater than 40% by weight makes the resin flow sluggish during the injection molding, making it impossible to obtain a slim molding. In addition, the molded product would be brittle against external forces such as bending, and would be easy to break if it receives even a slight deformation.

The right and left lens-holding rims members in this invention may be independent of each other or may be joined integrally by a bridge or brow bar. In either case, however, each rim member is of an open ring shape and a pair of side joints are molded integrally onto the two adjacent ends of the ring. These side joints are designed to close the ring of the rim, and for this purpose a screw is passed through holes formed in both the upper and lower side joints and is tightened to join the upper and lower side joints securely to each other. The ends of the annular rim are closed thusly with a lens mounted securely therein. One or both of said side joints may incorporate a hinge means or side hinges for attaching a temple, side hinges for fixing hinge means, or a member for attaching ornamentation such as an brow bar.

The lens-holding rim according to this invention is characterized by its slim configuration. For example, cross-sectional dimensions thereof can be reduced to about 1.2 mm in diameter at the slimmest part. Of course the cross-sectional dimensions need not be uniform around the whole circumference of the rim. The rim may be so designed that its cross-sectional dimensions become greater gradually toward its upper portion. The cross-sectional shape of the rim need not be circular; the rim could have any of the following cross-sectional shapes: , etc.

In practice the rim of the present invention, especially the rim made of resin reinforced with carbon fibers, may be preferred to have a metallic skin on the surface for the purpose of making it look like one made of metal. Such a metallic skin may be formed by a metallic paint coating, or dry or wet metal plating.

The metallic skin not only makes the black rim made of resin reinforced with carbon fibers look like one made of metal but also hides the black color of the rim. Therefore, the rim having a metallic skin can be produced in colors. For instance, the metallic skin can be covered by a pigment-colored top coating of alkyd resin paint, polyamide paint, polyurethane paint or acryl resin paint. Alternatively, after covering by a colorless and transparent top coating, the top coating may be dyed in color.

DESCRIPTION OF THE PREFERRED EMBODIMENTS

The invention will be described further below in connection with a number of preferred embodiments.

Figure 1:
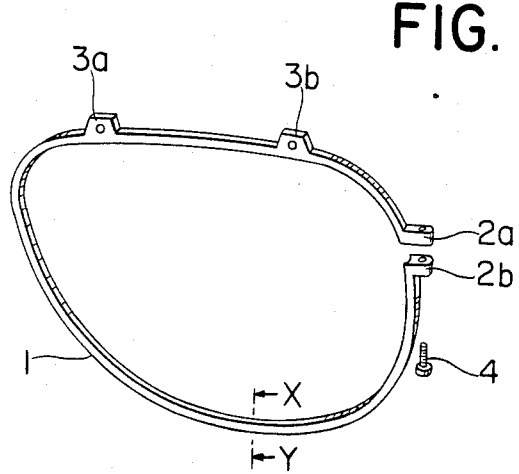
FIG. 1 is a perspective view of a spectacle rim part according to this invention.
Figure 1A:
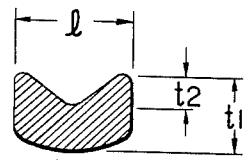
FIG. 1A is a section taken along the line X-Y of FIG. 1, in the indicated direction.

FIG. 1 is a perspective view of a spectacle part according to a first embodiment of this invention. FIG. 1A is a cross-sectional view of this part as taken along the line X-Y of FIG. 1, in the direction indicated by the arrows. As can be understood from the foregoing figures, the illustrative part consists of a substantially C-shaped (in section) lens-holding rim 1 and a pair of side joints, specifically, an upper side joint 2a and a lower side joint 2b, provided at the two adjacent ends of the annular frame 1. The frame 1 and the side joints 2a, 2b are molded as an integral structure. The frame 1 has protuberances 3a, 3b for fixing a connecting bar.

The lens-holding rim 1 has the following cross sectional dimensions: depth 1 around the whole circumference=2 mm; thickness $t_1 = 1.2$ mm; groove depth $t_2 = 0.5$ mm.

To form a rim part of the configuration shown in FIG. 1, a mold having a cavity configuration corresponding to the rim part was prepared. Using molding resin pellets of nylon 6, 6 containing 30% by weight of short carbon fibers with a diameter of 7 microns and an average length of 0.3 mm, the spectacle rim part shown in FIG. 1 was then molded in an ordinary injection molding machine at a rate of approximately 10 seconds per part. A one-hour immersion of the molded part in water at 90° C. improved the strength of the part. The integrally molded part was as slim as metal frames and had a strength sufficient to withstand practical use and comparable with that of metal frames. The side joints 2a, 2b of the molded part were drilled to form holes through which a screw 4 was passed and then tightened to join the two side joints securely to each other. For this purpose, a metallic tubular member through which the screw 4 passes may be inserted into the side joint 2b, while the other side joint 2a is provided with an internally threaded tubular member for receiving the externally threaded screw 4. Both of the tubular members may also be incorporated simultaneously by insertion molding. Alternatively, a hole slightly smaller than the screw diameter may be simply formed in each of the side joints and a tapping screw may be passed through the holes in the side joints to secure them.

Another part complementary to the part shown in FIG. 1 was similarly molded and both parts were joined hingedly by a connecting bar (not shown), thereby completing the front frame of the pair of spectacles.

Figure 2:
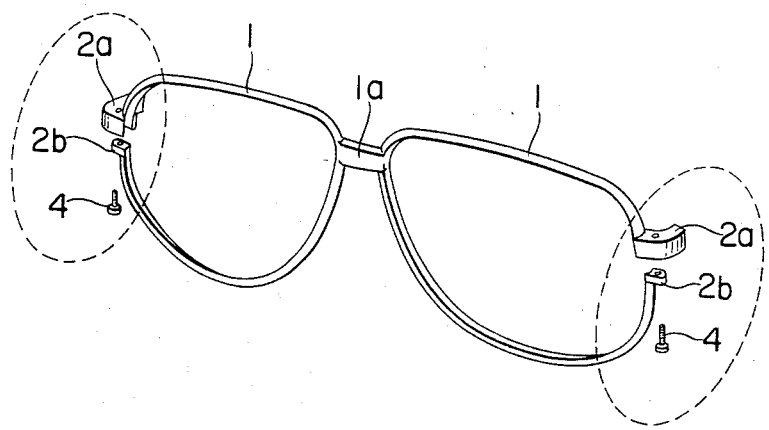
FIG. 2 is a perspective view of a second embodiment of a rim part according to this invention.

FIG. 2 illustrates a second embodiment of the invention. This frame part was molded with right and left lens-holding rim members 1 joined integrally with each other by a bridge 1a, as shown. In this embodiment, the upper side joint 2a doubled as a side hinge and the lower side joint 2b fitted in a recess in the underside of the upper side joint 2a and was thus removed from sight.

The molding resin used was nylon 6 (pellets) containing 40% by weight of short carbon fibers having a diameter of 6.5 microns and an average length of 0.3 mm. The frame part was injection molded in the same manner as previously described to obtain a slim front frame for a pair of spectacles. Appropriate hinging means for the connection of temples was provided for this front frame to complete it.

Figure 3:
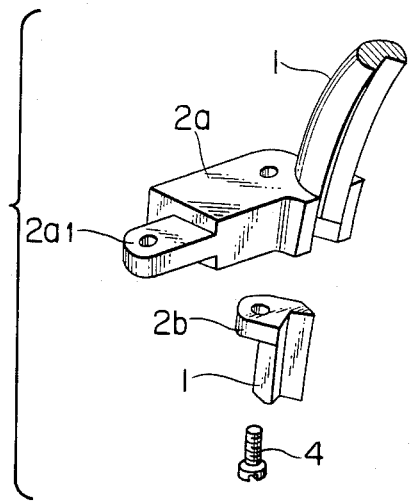
FIG. 3 is a partial enlarged perspective view of a third embodiment of this invention.

FIG. 3 depicts a third embodiment of the invention. This embodiment is basically the same as that of FIG. 2, but the portions encircled by dotted lines in FIG. 2 were constructed as shown in FIG. 3. In this example, the upper side joint 2a serves as a side hinge and also has an integral hinging lobe $2a_1$. The resin used in this embodiment was the same as used in the preceding embodiment and the part was injection molded in the manner previously described to obtain a slim front frame.

Figure 4:
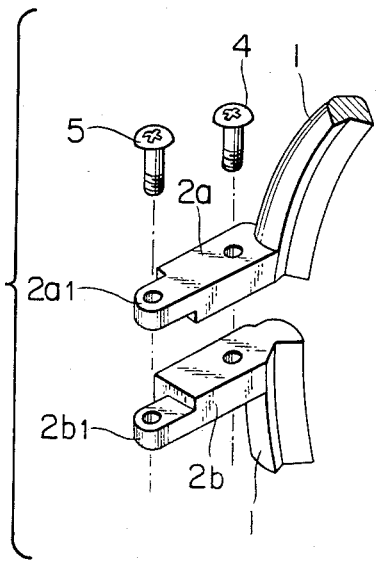
FIG. 4 is a partial enlarged perspective view of a fourth embodiment of this invention.

A fourth embodiment of the invention appears in FIG. 4. This frame is also the same as the embodiment of FIG. 2 in the basic design. The only difference is the inclusion of a connection mechanism as shown in FIG. 4 in the portions encircled by dotted lines in FIG. 2. In this example, a so-called "split side joint" was employed as the ring closing means of the lens-holding rims 1, and both the upper and lower side joints 2a and 2b had an integral hinging lobe ($2a_1$, $2b_1$). The hinging end of a temple (not shown) was inserted between the upper and lower hinging lobes $2a_1$ and $2b_1$, and a hinging screw 5 was passed therethrough to join the temple and frame pivotally.

To produce yet another embodiment, the earlier described rim of the type shown in FIG. 1 was coated with a metallic skin 15 microns thick by spraying metallic paint having the following composition:
epoxy resin varnish: 40 wt.%
aluminium powder: 15 wt.%
solvent mixture: 45 wt.%
    xylene: 81 wt.% butyl cellosolve: 7 wt.%
isobutyl alcohol: 7 wt.%
solvent naphtha: 5 wt.%
and drying at 180° C. for 60 min.

The coated rim has the appearance of a rim made of metal and was also lighter in weight than a rim made of metal.

I claim:

1. A slim spectacle rim part comprising an integral injection molding of thermoplastic resin reinforced with short carbon fibers having a maximum length of about 1 mm and mixed into the resin in an amount of about 10% to 40% of the total weight of the resin and fibers mixture, which molding is in the form of an open ring lens-holding rim with an integral pair of side joints located respectively at two adjacent ends of said open ring and extending laterally outward therefrom, said thermoplastic resin being continuous throughout said ring and said side joints so as not to have a weld line, said short carbon fibers extending over the thermoplastic resin of said ring and said side joints.

2. A slim spectacle rim part as defined in claim 1, wherein each of said side joints has an integral hinging lobe.

3. A slim spectacle rim part as defined in claim 1 or 2, wherein said thermoplastic resin is nylon.

4. A slim spectacle rim part as defined in claim 3, wherein said short carbon fibers having a length from about 0.05 to about 1 mm and a diameter from about 5 to about 15 microns.

5. A slim spectacle rim part according to claim 4 further comprising a metallic skin on the rim part.

6. A slim spectacle rim part as defined in claim 5, wherein said metallic skin is a metallic paint coating.

7. A slim spectacle rim part as defined in claim 5, wherein said metallic skin is a dry or wet metal plating.

* * * * *